US009769391B2

(12) United States Patent
Oshima

(10) Patent No.: US 9,769,391 B2
(45) Date of Patent: Sep. 19, 2017

(54) IMAGING DEVICE INCLUDING LIGHT MODULATION ELEMENT THAT VARIES BETWEEN HIGH AND LOW TRANSMITTANCE FOR EACH SEGMENT

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/274,051

(22) Filed: Sep. 23, 2016

(65) Prior Publication Data
US 2017/0013182 A1  Jan. 12, 2017

Related U.S. Application Data

(63) Continuation of application No. PCT/JP2015/055751, filed on Feb. 27, 2015.

(30) Foreign Application Priority Data

Mar. 24, 2014  (JP) .................................. 2014-060955

(51) Int. Cl.
*H04N 5/235*  (2006.01)
*G03B 7/091*  (2006.01)
(Continued)

(52) U.S. Cl.
CPC ........... *H04N 5/2352* (2013.01); *G03B 7/091* (2013.01); *H04N 5/238* (2013.01); *H04N 5/2355* (2013.01);
(Continued)

(58) Field of Classification Search
CPC .... H04N 5/2355; H04N 5/2351; H04N 5/238; H04N 5/2353; H04N 5/2254;
(Continued)

(56) References Cited

U.S. PATENT DOCUMENTS 7,106,377 B2*  9/2006  Bean ...................... H04N 5/238
                                                            348/364
7,245,325 B2   7/2007  Yamaguchi
(Continued)

FOREIGN PATENT DOCUMENTS

JP   2001-333329 A   11/2001
JP   2003-348439 A   12/2003

OTHER PUBLICATIONS

International Search Report for PCT/JP2015/055751 (PCT/ISA/210) mailed on May 19, 2015.
(Continued)

*Primary Examiner* — Michael Osinski
(74) *Attorney, Agent, or Firm* — Birch, Stewart, Kolasch & Birch, LLP

(57) ABSTRACT

Provided is an imaging device capable of expanding the dynamic range and eliminating differences in level occurring in low luminance regions between segments having different transmittances.
A number of high luminance pixels calculation section calculates the number of high luminance pixels for each segment, on the basis of pre-image data obtained through pre-imaging while all the segments of a light modulation element have high transmittances. A main control section determines, as a dimming target segment, a segment having a number of high luminance pixels equal to or greater than a first number of pixels. A low luminance pixel specifying section specifies low luminance pixels among the pixels corresponding to the dimming target segment. A gain correction section performs gain correction on pixel signal values of the low luminance pixels, with a gain value corresponding to a ratio of the high transmittance to the low transmittance.

12 Claims, 15 Drawing Sheets

(51) Int. Cl.
*H04N 5/238* (2006.01)
*H04N 5/243* (2006.01)
*H04N 5/232* (2006.01)
*H04N 9/04* (2006.01)

(52) U.S. Cl.
CPC ......... *H04N 5/243* (2013.01); *H04N 5/23293* (2013.01); *H04N 9/045* (2013.01)

(58) Field of Classification Search
CPC .... H04N 5/23229; H04N 5/235; H04N 5/243; H04N 5/3535; H04N 5/35554; H04N 5/35581; G06T 2207/20208; G06T 2207/10144; G02F 2001/133601; G09G 2320/062; G09G 2320/0646; G09G 2320/0686; G03B 7/08; G03B 7/091
See application file for complete search history.

(56) References Cited

U.S. PATENT DOCUMENTS

| | | | | |
|---|---|---|---|---|
| 7,688,359 B2* | 3/2010 | Zhao | H04N 5/2351 | 348/221.1 |
| 7,825,955 B2* | 11/2010 | Kato | H04N 5/2351 | 348/221.1 |
| 8,159,558 B2* | 4/2012 | Takemura | H04N 5/57 | 348/222.1 |
| 8,773,577 B2* | 7/2014 | Velarde | H04N 5/232 | 348/364 |
| 8,885,092 B2* | 11/2014 | Mori | H04N 5/23219 | 348/221.1 |
| 9,204,056 B2* | 12/2015 | Kaizu | H04N 5/2353 | |
| 9,247,167 B2* | 1/2016 | Pitter | H04N 5/343 | |
| 9,251,573 B2* | 2/2016 | Kobayashi | G06T 5/009 | |
| 9,386,245 B2* | 7/2016 | Fujita | H04N 5/367 | |
| 2002/0012064 A1* | 1/2002 | Yamaguchi | H04N 5/2254 | 348/362 |
| 2003/0011700 A1* | 1/2003 | Bean | H04N 5/2254 | 348/348 |
| 2003/0020958 A1* | 1/2003 | Bean | H04N 5/2254 | 358/302 |
| 2003/0052989 A1* | 3/2003 | Bean | H04N 5/238 | 348/362 |
| 2007/0115372 A1* | 5/2007 | Wu | H04N 5/2351 | 348/230.1 |
| 2008/0252750 A1* | 10/2008 | Ogawa | H04N 5/23232 | 348/229.1 |
| 2008/0253758 A1* | 10/2008 | Yap | G03B 7/08 | 396/234 |
| 2010/0020198 A1* | 1/2010 | Okamoto | H04N 5/23212 | 348/231.99 |
| 2010/0150473 A1* | 6/2010 | Kwon | G06T 5/50 | 382/284 |
| 2011/0128435 A1* | 6/2011 | Ikeda | H04N 5/2351 | 348/362 |
| 2011/0149129 A1* | 6/2011 | Kim | H04N 5/2351 | 348/296 |
| 2012/0133793 A1* | 5/2012 | Inaba | H04N 5/2351 | 348/229.1 |
| 2012/0188373 A1* | 7/2012 | Kwon | H04N 1/409 | 348/148 |
| 2012/0287294 A1* | 11/2012 | Kaizu | H04N 5/2355 | 348/208.4 |
| 2013/0063628 A1* | 3/2013 | Kubota | H04N 5/217 | 348/241 |
| 2013/0120607 A1* | 5/2013 | Manabe | H04N 5/2355 | 348/223.1 |
| 2014/0064632 A1* | 3/2014 | Manabe | G06T 5/00 | 382/254 |
| 2014/0232764 A1* | 8/2014 | Nishio | G09G 3/3426 | 345/690 |
| 2014/0232929 A1* | 8/2014 | Ichikawa | H04N 5/2355 | 348/362 |
| 2015/0009352 A1* | 1/2015 | Shibagami | H04N 5/2355 | 348/218.1 |
| 2015/0097853 A1* | 4/2015 | Bastani | G09G 5/10 | 345/589 |
| 2015/0116389 A1* | 4/2015 | Watanabe | G09G 3/3426 | 345/694 |
| 2015/0242701 A1* | 8/2015 | Tokui | H04N 5/243 | 382/190 |
| 2017/0019579 A1* | 1/2017 | Matsunaga | H04N 5/2355 | |

OTHER PUBLICATIONS

Written Opinion of the International Searching Authority for PCT/JP2015/055751 (PCT/ISA/237) mailed on May 19, 2015.

* cited by examiner

IMAGING DEVICE INCLUDING LIGHT MODULATION ELEMENT THAT VARIES BETWEEN HIGH AND LOW TRANSMITTANCE FOR EACH SEGMENT

CROSS-REFERENCE TO RELATED APPLICATION

This application is a Continuation of PCT International Application PCT/JP2015/055751 filed on 27 Feb. 2015, which claims priority under 35 USC 119(a) from Japanese Patent Application No. 2014-060955 filed on 24 Mar. 2014. The above application is hereby expressly incorporated by reference, in its entirety, into the present application.

BACKGROUND OF THE INVENTION

1. Field of the Invention

The present invention relates an imaging device having a light modulation element for expanding a dynamic range of an imaging element.

2. Description of the Related Art

In imaging devices such as digital cameras, imaging is performed by performing photoelectric conversion on a subject image through an imaging element (a CCD sensor, a CMOS sensor, or the like), and image data is generated. However, the imaging element has a dynamic range (gray level reproducibility) lower than that of a conventional silver halide film, and is unable to sufficiently reproduce a gray level of a subject. For example, assuming that exposure is adjusted for a dark part of a subject, a luminance value of a captured image signal of a bright part of the subject becomes saturated, and thus a so-called white coloration occurs.

For this reason, the following technology was proposed: there is provided a plurality of segments, a light modulation element, of which a light transmittance is variable for each segment, is disposed on the front side of the imaging element, and imaging is performed in a state where the transmittances of the segments corresponding to the bright part of the subject are lowered and light is dimmed, thereby preventing the white coloration (refer to JP2003-348439A and JP2001-333329A). Thereby, the dynamic range of the imaging element is artificially expanded. In JP2003-348439A, as the light modulation element, an electrochromic (EC) filter is used. In JP2001-333329A (corresponding to U.S. Pat. No. 7,245,325), as the light modulation element, a liquid crystal filter is used.

Assuming that a segment of the light modulation element is provided for each single pixel of the imaging element, light modulation control is performed with high accuracy. However, the number of pixels of the imaging element is large, and thus components such as a controller and a memory for controlling segments corresponding to the number of pixels are necessary. Hence, in JP2003-348439A and JP2001-333329A, a single segment can be allocated to a plurality of pixels so as to decrease the number of segments.

However, in a case where a single segment is allocated to a plurality of pixels, assuming that a transmittance is controlled for each segment, luminance values of a plurality of pixels corresponding to a single segment are increased or decreased together. Therefore, differences in level occur in the luminances of the pixels, between segments having different transmittances.

Accordingly, in the description of JP2003-348439A, the level difference is made unnoticeable by adjusting a gain of signal values of pixels near the boundaries of the segments having different transmittances. In the description of JP2001-333329A, more specifically, the level difference is made unnoticeable by performing low pass filter processing which is one type of digital filter processing.

However, a single segment includes not only a whiter region (high luminance region) but also a less white region (low luminance region). Thus, the low luminance region is dimmed together with the whiter region, and the luminance decreases. Assuming that the low luminance region stretches over the boundaries between segments having different transmittances, differences in level in the luminance occur. Level-difference correction processing described in JP2003-348439A and JP2001-333329A is processing of making only the boundaries between the segments unnoticeable. Therefore, it is not possible to eliminate the differences in level between segments themselves in the low luminance regions.

SUMMARY OF THE INVENTION

The present invention has an object to provide an imaging device capable of eliminating differences in level occurring in the low luminance regions between segments having different transmittances.

In order to achieve the object, an imaging device of the present invention has a plurality of segments, and comprises a light modulation element, an imaging element, a number of high luminance pixels calculation section, a control section, a low luminance pixel specifying section, and a gain correction section. The light modulation element has a light transmittance which varies between a high transmittance and a low transmittance for each segment. Light is incident through the light modulation element into the imaging element, and a plurality of pixels is disposed in each segment. The number of high luminance pixels calculation section calculates the number of high luminance pixels which have luminance values equal to or greater than a first luminance value for each segment, on the basis of a captured image signal which is obtained by the imaging element while the transmittances of all the segments are the same. The control section controls the light modulation element such that segments each having a number of high luminance pixels equal to or greater than a first number of pixels are set at the low transmittance and the other segments are set at the high transmittance. The low luminance pixel specifying section specifies low luminance pixels having luminance values equal to or less than a second luminance value in the segments which are set at the low transmittance. The gain correction section performs gain correction on pixel signal values of the low luminance pixels, with a gain value corresponding to a ratio of the high transmittance to the low transmittance.

It is preferable that the low luminance pixel specifying section acquires maximum luminance values in a luminance distribution of the pixels respectively corresponding to a plurality of segments adjacent to the segments which are set at the low transmittance, and sets a minimum value of the maximum luminance values to the second luminance value. In this case, it is preferable that the low luminance pixel specifying section sets a luminance value, at which a cumulative frequency of the luminance distribution is equal to a specific value, to the maximum luminance value.

It is preferable that in a case where a value obtained by dividing the second luminance value by the gain value is set as a threshold value, the gain correction section receives the gain value in a range equal to or less than the threshold value, and performs the gain correction by using a gain function which decreases in inverse proportion to the second luminance value in a range greater than the threshold value.

The imaging device further comprises a number of error pixels calculation section that calculates the number of error pixels which is the number of low luminance pixels, of which the pixel signal values have reached an upper limit value of a gray level which can be taken, in a case where the gain correction is performed on the segments which are set at the low transmittance. It is preferable that the control section sets the segments, each of which has a number of high luminance pixels equal to or greater than the first number of pixels and a number of error pixels equal to or less than a second number of pixels, at the low transmittance.

It is preferable that the light modulation element is a polymer network liquid crystal device.

The imaging device further comprises an ISO sensitivity setting section that sets an ISO sensitivity. It is preferable that the control section controls the light modulation element only in a case where a set value of the ISO sensitivity is equal to or less than a certain value.

It is preferable that moving image capturing and live view display can be performed. It is preferable that the control section controls the light modulation element in a state where the moving image capturing and the live view display are executed.

The imaging element is a single-plate color type imaging element that outputs one type of color signal for each pixel from a plurality of types of color signals. The imaging device further comprises a luminance color difference conversion section that converts the plurality of types of color signals into luminance values and color difference values for each pixel. It is preferable that the number of high luminance pixels calculation section calculates the number of the high luminance pixels, on the basis of the luminance values.

It is preferable that the gain correction section performs the gain correction on each of the plurality of types of color signals of the low luminance pixels.

It is preferable that in an event of performing the gain correction on the segments which are set at the low transmittance, in a case where a minimum gain margin of values of the plurality of types of color signals of the low luminance pixels is less than the gain value, the gain correction section sets the gain value as the minimum gain margin, and performs the gain correction.

It is preferable that the plurality of color signals is red, green, and blue pixel signals.

According to the present invention, the gain correction is performed on the pixel signal values of the low luminance pixels corresponding to the segments which are set at the low transmittance, with the gain value corresponding to a ratio of the high transmittance to the low transmittance. Therefore, it is possible to eliminate the differences in level occurring in the low luminance regions between segments having different transmittance.

DESCRIPTION OF THE PREFERRED EMBODIMENTS

First Embodiment

Figure 1:
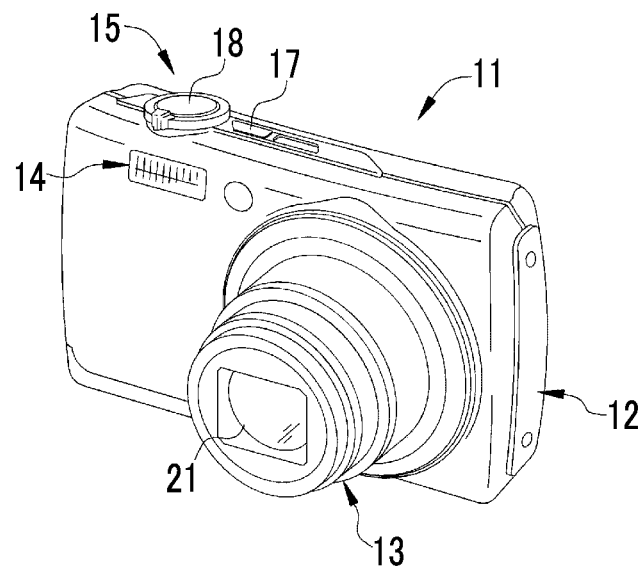
FIG. 1 is a perspective view of the front side of the digital camera.
Figure 2:
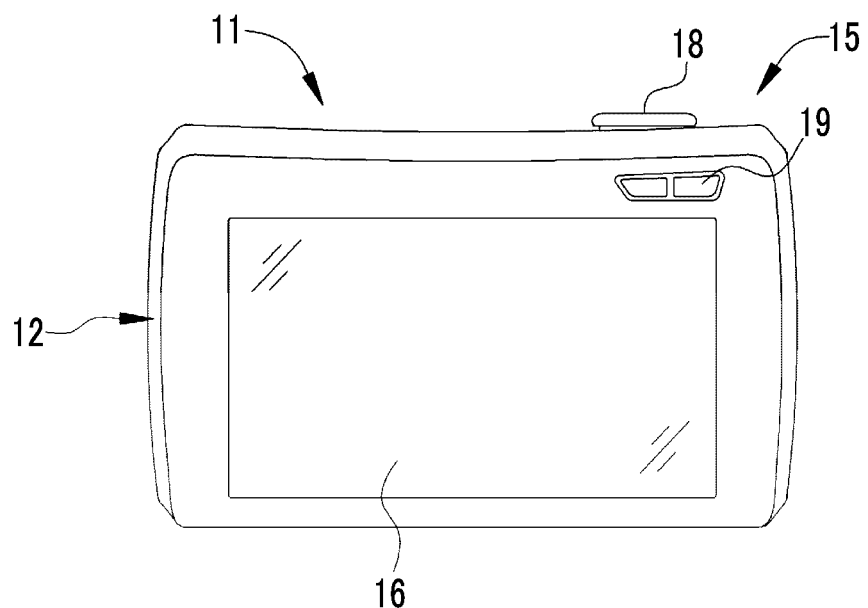
FIG. 2 is a rear view of a digital camera.

In FIGS. 1 and 2, a digital camera 11 as an imaging device comprises a camera main body 12, a lens barrel 13, a flash light emitting section 14, an operation section 15, and a display section 16. The lens barrel 13 is provided on the front side of the camera main body 12 so as to hold an imaging lens 21. The flash light emitting section 14 is provided on the front side of the camera main body 12 so as to emit flash light toward a subject at the time of imaging.

The operation section 15 has a power supply button 17, a release button 18, a mode selection button 19, and the like, and is provided on the top of the camera main body 12. The power supply button 17 is operated at the time that a power source (not shown in the drawing) of the digital camera 11 is turned on/off. The release button 18 is operated at the time that imaging is performed. The mode selection button 19 is operated at the time that the operation mode of the digital camera 11 is switched.

The release button 18 has a two-stage-stroke-type switch (not shown in the drawing) including a S1 switch and a S2 switch. The digital camera 11 performs an imaging preparation operation such as an auto focus (AF) operation or auto exposure (AE) control assuming that the release button 18 is pressed down (pressed halfway) and the S1 switch is turned on. From this state, assuming that the release button 18 is further pressed down (pressed fully) and the S2 switch is turned on, the digital camera 11 performs the imaging operation.

The operation modes of the digital camera 11 include a still image capturing mode, a moving image capturing mode, a reproduction mode, and the like. In the still image capturing mode, a still image is acquired. In the moving image capturing mode, a moving image is acquired. In the reproduction mode, each acquired image is reproduced and displayed on the display section 16. Further, in the still image capturing mode, a normal mode and a dynamic range (DR) expansion mode can be selected.

The display section 16 is formed of a liquid crystal display and the like, and displays images, which are acquired in various imaging modes, and a menu screen for performing various settings. The imaging conditions such as ISO sensitivity can be set using the mode selection button 19 and the like. The mode selection button 19 and the like correspond to the ISO sensitivity setting section.

Further, the display section 16 displays a live view image until imaging is performed until the operation mode is set as the still image capturing mode or the moving image capturing mode. A user observes the live view image which is displayed on the display section 16, whereby it is possible to determine the composition of the subject.

Furthermore, in the digital camera 11, a slot (not shown in the drawing) for mounting a recording medium 40 (refer to FIG. 3) to be described later is provided.

Figure 3:
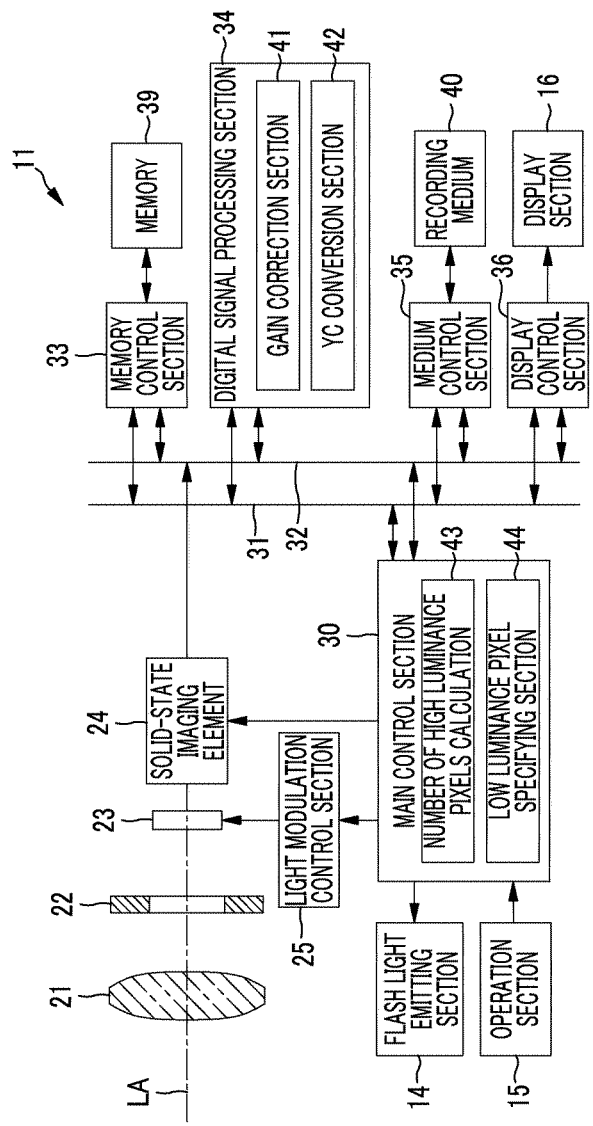
FIG. 3 is a block diagram illustrating an electrical configuration of the digital camera.

The flash light emitting section 14 performs a flash light emitting operation on the basis of control which is performed by the main control section 30 (refer to FIG. 3). The main control section 30 integrally controls the entirety of the digital camera 11 on the basis of the operation signal which is input from the above-mentioned operation section 15.

In FIG. 3, in the digital camera 11, a diaphragm 22, a light modulation element 23, and a solid-state imaging element 24 are sequentially provided along an optical axis LA of the imaging lens 21. The diaphragm 22 is formed of a plurality of movable blades forming an opening portion so as to change the size of the opening portion, thereby adjusting an amount of light which is incident into the light modulation element 23.

Figure 4:
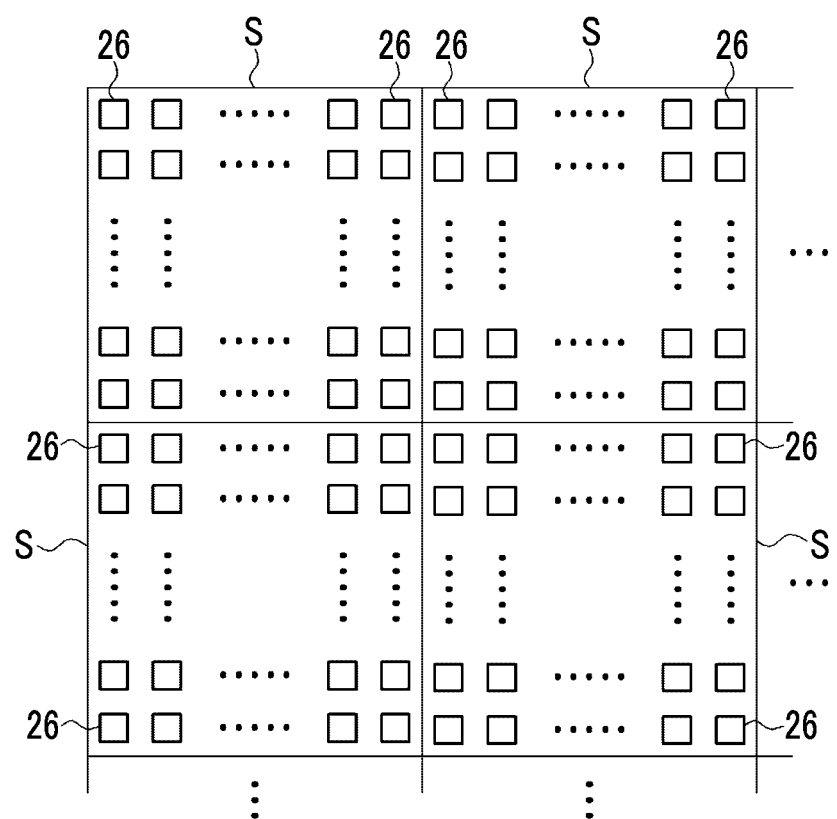
FIG. 4 is a diagram illustrating the segments of a solid-state imaging element and a light modulation element.

The light modulation element 23 is formed of a polymer network liquid crystal (PNLC) filter having a plurality of segments S (refer to FIG. 4). The light modulation element 23 is disposed on the light incident side of the solid-state imaging element 24, and an amount of light, which is incident into the solid-state imaging element 24, is adjusted (modulated) for each segment S. That is, a subject image is partially dimmed through the light modulation element 23 and incident into the solid-state imaging element 24.

The light modulation control section 25 separately controls a light transmittance for each segment S by driving each segment S of the light modulation element 23, on the basis of the control which is performed by the main control section 30. Each segment S is at a high transmittance T1 at the time of non-driving (hereinafter referred to as an off state), and is at a low transmittance T2 at the time of driving (hereinafter referred to as an on state). In the present embodiment, it is assumed that T1=100% and T2=50%.

The solid-state imaging element 24 is a single-plate color type complementary metal-oxide-semiconductor (CMOS) image sensor. The solid-state imaging element 24 has a light receiving surface formed of a plurality of pixels 26 which are arranged in a two-dimensional matrix shape as shown in FIG. 4. Each pixel 26 includes a photoelectric conversion element, and photoelectrically converts a subject image, which is formed on the light receiving surface, so as to output pixel signals. Hereinafter, the pixel signal per one frame is referred to as a captured image signal.

In the single pixel 26, a color filter (not shown in the drawing), which has anyone color of three colors of red (R), green (G), and blue (B), is provided on the light incident side of each pixel 26, and each pixel outputs one color signal. The pixel 26 provided with a red color filter outputs a red pixel signal Rs as a color signal. The pixel 26 provided with a green color filter outputs a green pixel signal Gs as a color signal. The pixel 26 provided with a blue color filter outputs a blue pixel signal Bs as a color signal.

The segments S of the light modulation element 23 are arranged in a two-dimensional matrix shape, and a plurality of pixels 26 is disposed in the single segment S. Each segment S respectively corresponds to pixels 26 of which the number is the same. The main control section 30 detects a correspondence relationship between the pixels 26 and the segments S.

Further, the solid-state imaging element 24 comprises a denoising circuit, an auto gain controller, and a signal processing circuit such as an analog-to-digital (A/D) conversion circuit (any of those is not shown in the drawing). The denoising circuit performs denoising processing on the captured image signal. The auto gain controller amplifies a level of the captured image signal to an optimum value. The A/D conversion circuit converts the captured image signal into a digital signal, and outputs the signal from the solid-state imaging element 24. The solid-state imaging element 24 outputs any one of the pixel signals Rs, Gs, and Bs for each pixel 26. Hereinafter, the pixel signals Rs, Gs, and Bs per one frame, which are output from the solid-state imaging element 24, are referred to as RGB image data. Each of the pixel signals Rs, Gs, and Bs has a gray level range of 0 to 255.

The solid-state imaging element 24 performs driving control through the main control section 30 in response to the imaging mode which is selected by the mode selection button 19. The main control section 30 controls the sections on the basis of a predetermined imaging condition according to the imaging mode which is selected by the mode selection button 19.

The main control section 30 is connected to a control bus 31 and a data bus 32. The solid-state imaging element 24 is connected to the data bus 32. A memory control section 33, a digital signal processing section 34, a medium control section 35, and a display control section 36 are connected to the control bus 31 and the data bus 32.

A memory 39 for a temporary storage such as SDRAM is connected to the memory control section 33. The memory control section 33 inputs the RGB image data, which is output from the solid-state imaging element 24, to the memory 39, and stores the data. Further, the memory control section 33 outputs the RGB image data, which is stored in the memory 39, to the digital signal processing section 34.

The digital signal processing section 34 performs defect correction processing, demosaic processing, gamma correction processing, white balance correction processing, and the like, on the RGB image data which is input from the memory 39. The demosaic processing is defined as processing of generating a single group of the pixel signals Rs, Gs, and Bs for one pixel through interpolation processing.

Further, the digital signal processing section 34 is provided with a gain correction section 41 and a YC conversion section (luminance color difference conversion section) 42. The gain correction section 41 is driven on the basis of the control which is performed by the main control section 30, acquires the RGB image data subjected to the demosaic processing and stored in the memory 39, and performs the gain correction on the pixel signals Rs, Gs, and Bs for each pixel. The digital signal processing section 34 inputs and stores the RGB image data, which is subjected to the gain correction through the gain correction section 41, to and in the memory 39.

The YC conversion section 42 is driven on the basis of the control which is performed by the main control section 30, acquires the RGB image data subjected to the gain correction and stored in the memory 39, and performs the YC conversion processing for YC conversion on the pixel signals Rs, Gs, and Bs for each pixel. In the YC conversion processing, YC image data, which has a luminance value Y and color difference values Cr and Cb for each pixel, is generated. The digital signal processing section 34 inputs and stores the YC image data, which is generated by the YC conversion section 42, to and in the memory 39. Each of the luminance value Y and the color difference values Cr and Cb has a gray level range of 0 to 255.

The medium control section 35 controls recording and reading of image files into and from the recording medium 40. The recording medium 40 is, for example, a memory card into which a flash memory and the like are built. Formats of the image files, which are recorded in the recording medium 40, are set through the operation section 15.

In a case of the still image capturing mode, as the image files, for example, compressed image data, which is obtained by compressing the YC image data in conformity with the JPEG standard, is recorded into the recording medium 40. Further, in a case of the moving image capturing mode, moving image data, which is obtained by compressing the YC image data of a plurality of frames obtained through moving image capturing in conformity with the MPEG-4 standard, recorded into the recording medium 40. Such compression processing is performed by the digital signal processing section 34. In addition, in the case of the moving image capturing mode, in addition to the images, sound is acquired and recorded, but in the present embodiment, a description of a configuration for acquiring and recording sound will be omitted.

The display control section 36 controls image display on the above-mentioned display section 16. The display control section 36 converts the YC image data, which is generated by the digital signal processing section 34, into a video signal complying with the NTSC standard, and outputs an image to the display section 16.

The main control section 30 has a CPU and an internal memory in which processing programs are stored (both are not shown in the drawing). The main control section 30 performs an imaging operation by controlling the section in accordance with an imaging flow prescribed by the processing programs.

Figure 5:
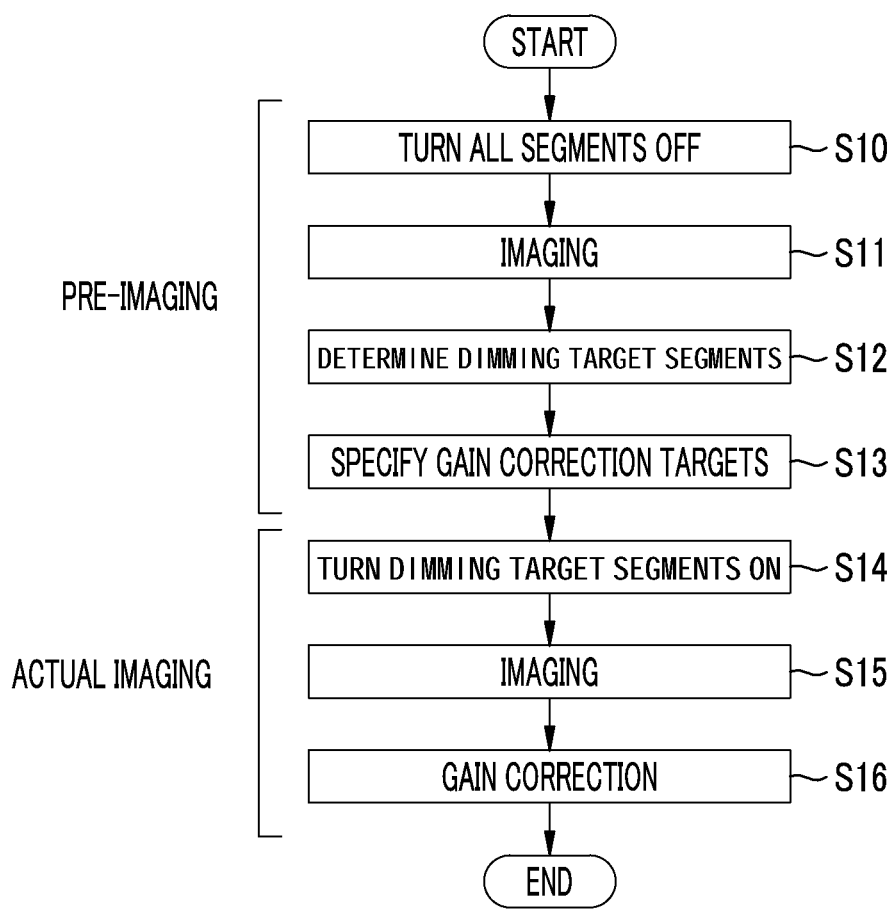
FIG. 5 is a flowchart illustrating an imaging operation in a DR expansion mode.

In the DR expansion mode, the imaging operation is performed such that pre-imaging and actual imaging are performed as one operation, as shown in FIG. 5. Specifically, in the pre-imaging, all the segments S of the light modulation element 23 are turned off (set at a high transmittance T1) (S10), a subject image is captured, and RGB image data is acquired (S11). The RGB image data is converted into the YC image data (hereinafter referred to as pre-image data PD), and the segments S (hereinafter referred to as dimming target segments S1), which correspond to a high luminance part of the subject image, are determined on the basis of the luminance values Y of pre-image data PD (S12). Then, low luminance pixels as gain correction targets are specified from pixels corresponding to the dimming target segments S1 (S13).

In the actual imaging, the dimming target segments S1 are turned on (S14), a subject image is captured, and RGB image data is acquired (S15). The RGB image data is converted into the YC image data by performing gain correction on the low luminance pixels as gain correction targets (S16).

Hereinafter, the other segments S, which are not determined as the dimming target segments S1, are referred to as non-dimming target segments S2.

In the normal mode, all the segments S of the light modulation element 23 are turned off, and only the actual imaging is performed.

In the main control section 30, a number of high luminance pixels calculation section 43 and a low luminance pixel specifying section 44 are implemented by the processing programs. The number of high luminance pixels calculation section 43 determines the dimming target segments S1 in the DR expansion mode. The low luminance pixel specifying section 44 specifies the low luminance pixels as gain correction targets.

The number of high luminance pixels calculation section 43 compares each luminance value Y of the pre-image data PD for each segment S with a certain threshold value (first luminance value) TH1, and calculates the number of high luminance pixels (number of high luminance pixels) PH having luminance values Y equal to or greater than the first luminance value TH1. The main control section 30 compares the number of high luminance pixels PH of each segment S with a predetermined number (first number of pixels) PN, and determines the segments S, which have the number of high luminance pixels PH equal to or greater than the first number of pixels PN, as dimming target segments S1. The first luminance value TH1 is set as, for example, a median (128) of the gray level. The first number of pixels PN is set as, for example, a half of the total number of pixels within the segment S.

Figure 6:
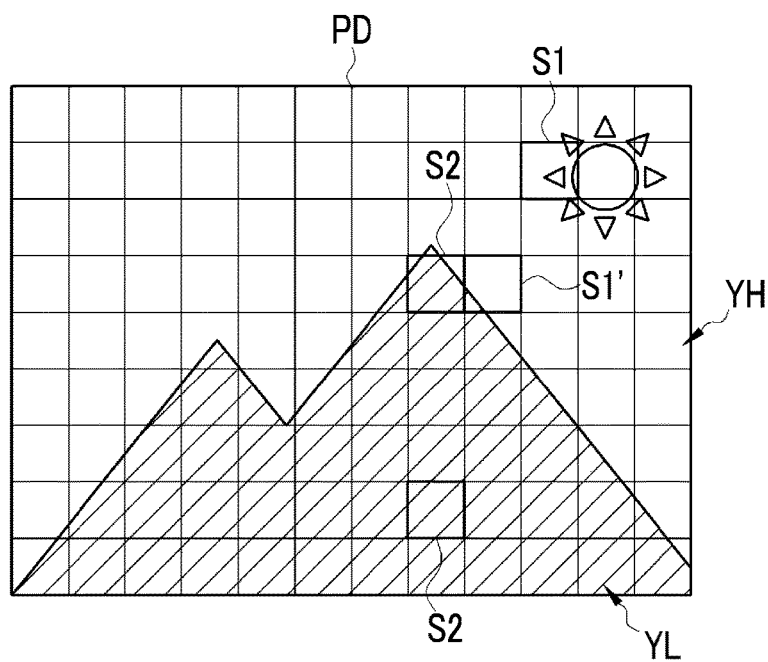
FIG. 6 is a diagram illustrating pre-image data.

For example, as shown in FIG. 6, in a case where an image of a landscape including sun and mountains is captured, the pre-image data PD, which is obtained through the pre-imaging, includes bright regions (high luminance region) YH such as sun and peripheries thereof and dark regions (low luminance region) YL such as mountains.

Figure 7:
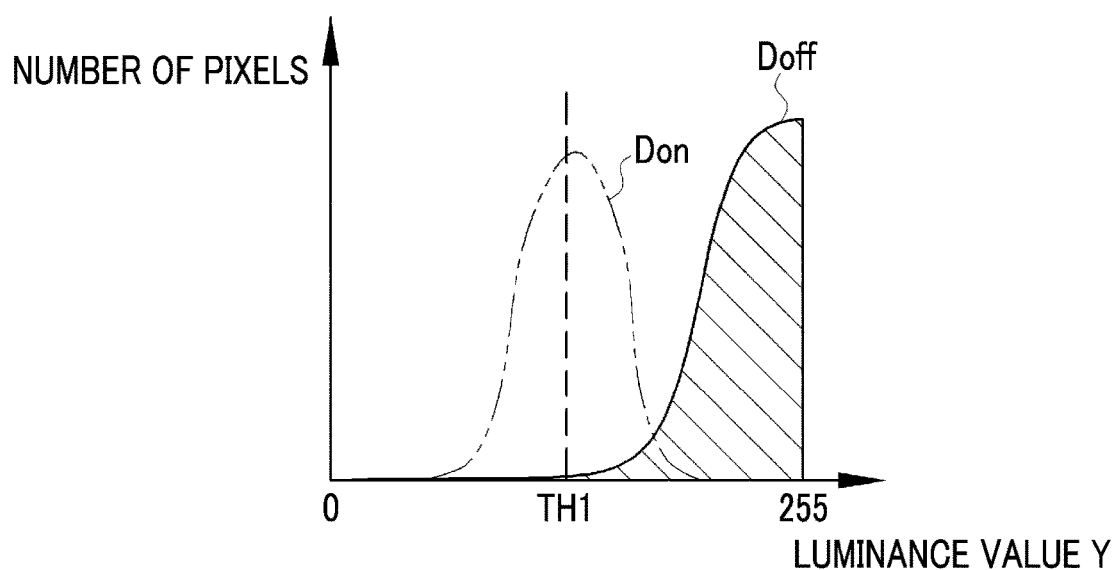
FIG. 7 is a diagram illustrating a luminance distribution of a dimming target segment.

FIG. 7 shows a luminance distribution of the dimming target segments S1 including the "whiter region" of which the luminance value Y reaches a saturated value (Y=255). The luminance distribution Doff is a luminance distribution at the time of the pre-imaging. The luminance distribution Don is a luminance distribution which is obtained by performing the actual imaging in a state where the dimming target segments S1 are turned on. Compared with the luminance distribution Doff, the luminance distribution Don is shifted to the low luminance side as a whole, due to a dimming effect caused by the dimming target segments S1.

Figure 8:
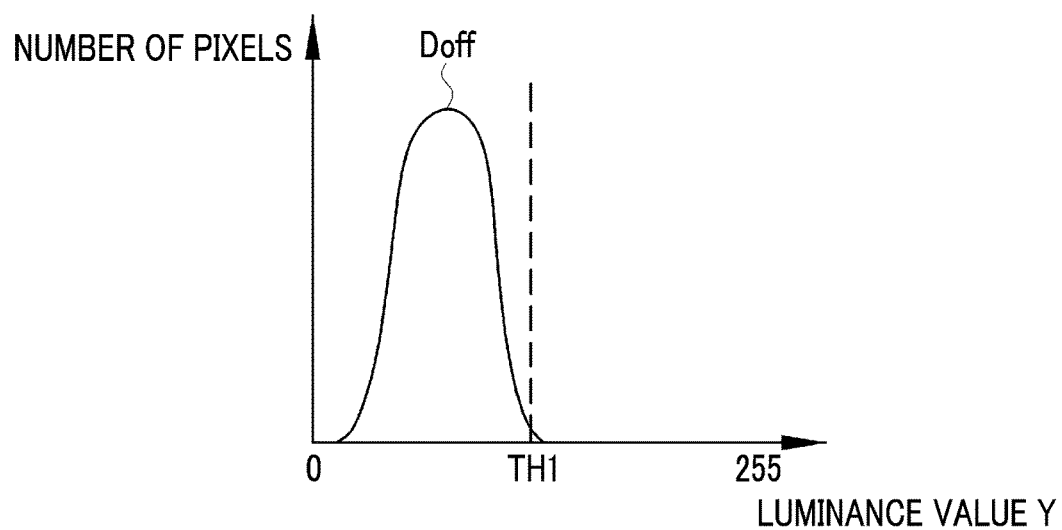
FIG. 8 is a diagram illustrating a luminance distribution of a non-dimming target segment.

FIG. 8 shows a luminance distribution Doff at the time of the pre-imaging of the non-dimming target segments S2. In the luminance distribution Doff, the number of high luminance pixels PH is small, and a relationship of PN≤PH is not satisfied. As a result, the segments are not set as the dimming targets, and remain turned off at the time of the actual imaging.

By performing the actual imaging in a state where the dimming target segments S1 are turned on and the non-dimming target segments S2 are turned off, the whiter region is eliminated, and a dynamic range of the solid-state imaging element 24 is expanded artificially.

Figure 9:
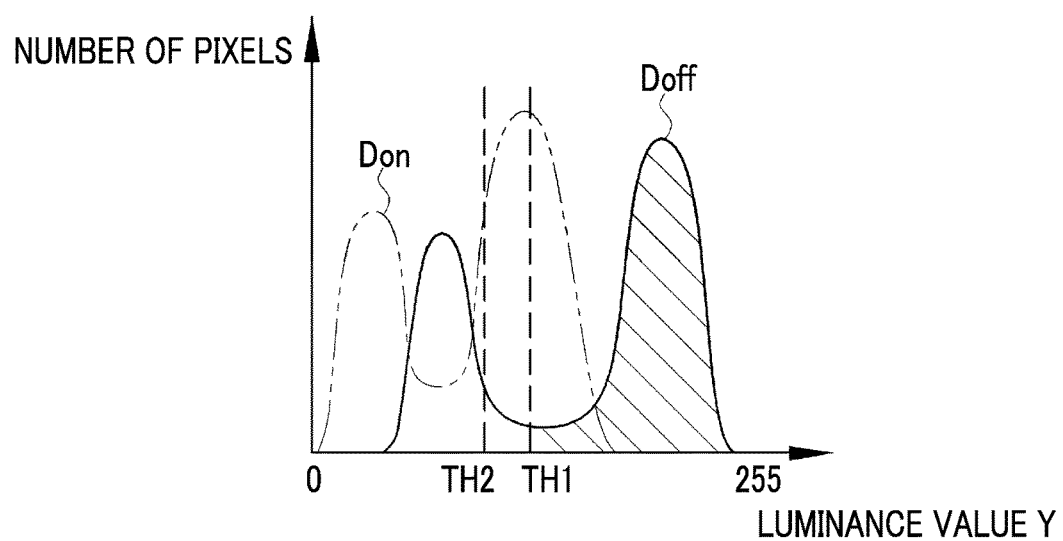
FIG. 9 is a diagram illustrating a luminance distribution of the dimming target segment adjacent to the non-dimming target segment.

Among the dimming target segments S1, there are segments (for example, dimming target segments S1' in FIG. 6) adjacent to the non-dimming target segments S2. Such a dimming target segment S1' includes not only the high luminance region YH but also mainly includes the low luminance region YL. Hence, as shown in FIG. 9, the luminance distribution Doff at the time of the pre-imaging of the dimming target segment S1' includes distribution corresponding to the high luminance region YH and distribution corresponding to the low luminance region YL. The low luminance region YL stretches over the adjacent non-dimming target segments S2.

In the luminance distribution Don which is obtained by performing the actual imaging in a state where the dimming target segment S1' is turned on, as shown in FIG. 9, not only distribution corresponding to the high luminance region YH is shifted to the low luminance side, but also distribution corresponding to the low luminance region YL is more shifted to the low luminance side. Thereby, in the image data obtained through the actual imaging, a difference in level of the luminance value of the low luminance region YL occurs between the dimming target segment S1' and the non-dimming target segment S2.

Figure 10:
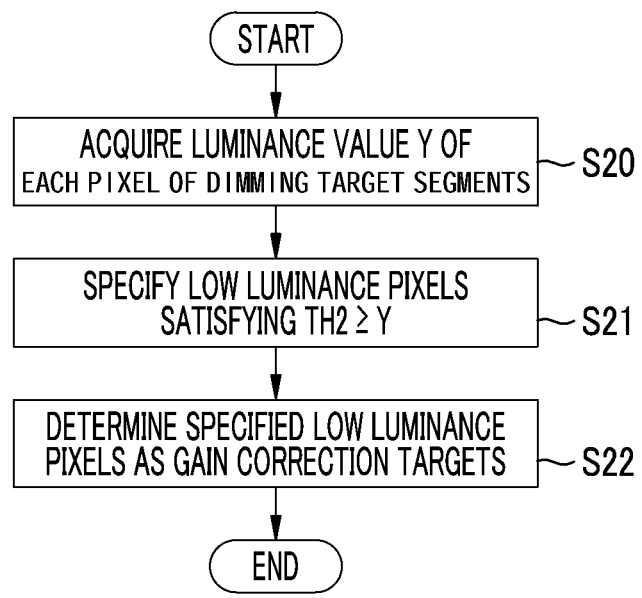
FIG. 10 is a flowchart illustrating a determination procedure of the low luminance pixel which is set as a gain correction target.

FIG. 10 shows a flow of determination of the low luminance pixels as the gain correction targets. The low luminance pixel specifying section 44 acquires the luminance value Y of each pixel corresponding to the dimming target segment S1 from the pre-image data PD (S20), and compares each luminance value Y with a certain threshold value (second luminance value) TH2. Then, the low luminance pixel specifying section 44 specifies the low luminance pixels of which the luminance values Y are equal to or less than the second luminance value TH2 (S21). The main control section 30 determines the specified low luminance pixels as gain correction targets (S22). Here, regarding the second luminance value TH2, for example, as shown in FIG. 9, a relationship of TH2≤TH1 is satisfied, but a relationship of TH2>TH1 is satisfied.

The gain correction of the low luminance pixels determined as gain correction targets is performed by the gain correction section 41. The gain correction section 41 multiplies the gain value G by each of the pixel signals Rs, Gs, and Bs of the low luminance pixel on the basis of Expressions (1) to (3), and generates pixel signals Rs', Gs', and Bs'. The gain value G is a ratio of the high transmittance T1 to the low transmittance T2 (that is, G=T1/T2). In the present embodiment, T1=100%, and T2=50%, and therefore the gain value G is "2".

$$Rs'=Rs \times G \quad (1)$$

$$Gs'=Gs \times G \quad (2)$$

$$Bs'=Bs \times G \quad (3)$$

The pixel signals Rs', Gs', and Bs' subjected to the gain correction is YC-converted by the YC conversion section 42. The gain correction eliminates the above-mentioned differences in level.

Figure 11:
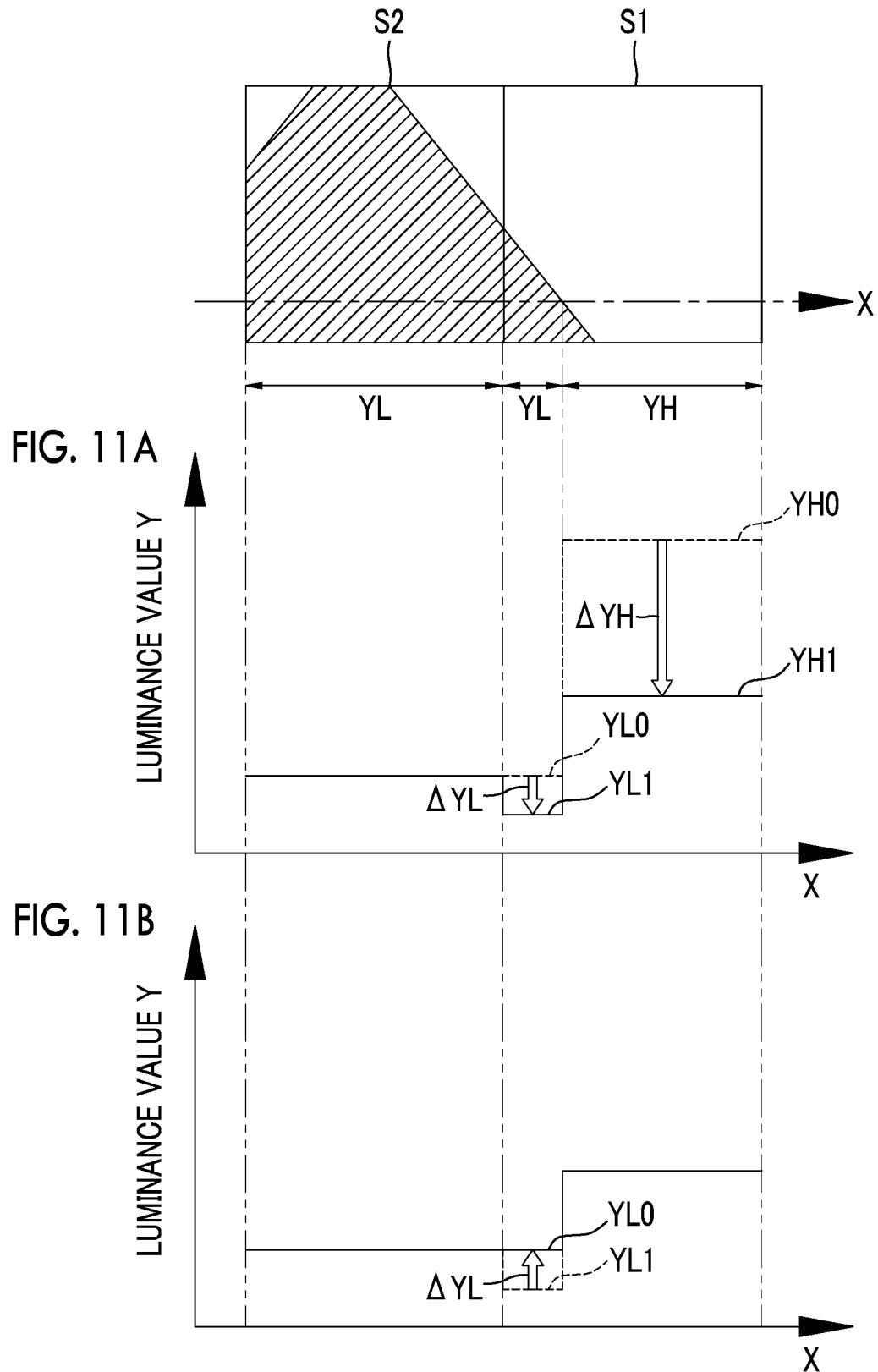
FIGS. 11A and 11B are schematic diagrams illustrating correction of a difference in level occurring between the non-dimming target segment and the dimming target segment.

The elimination of the differences in level will be schematically described with reference to FIGS. 11A and 11B. The dimming target segment S1 is turned off at the time of the pre-imaging, and is turned on at the time of the actual imaging. Therefore, as shown in FIG. 11A, the luminance value of the high luminance region YH of the dimming target segment S1 is lowered from the luminance value YH0 to the luminance value YH1 by an amount ΔYH according to the dimming effect. Further, the luminance value of the low luminance region YL of the dimming target segment S1 is lowered from the luminance value YL0 to the luminance value YL1 by an amount ΔYL according to the dimming effect.

In contrast, the non-dimming target segment S2 is turned off at both the time of the pre-imaging and the time of the actual imaging, and therefore there is no change in luminance value. Hence, the difference in level of the amount ΔYL according to the dimming effect occurs between the low luminance region YL of the dimming target segment S1 and the low luminance region YL of the non-dimming target segment S2. The difference in level is a value corresponding to a ratio T1/T2 of a light transmittance of the dimming target segment S1 to a light transmittance of the non-dimming target segment S2. The gain correction, which is performed by the gain correction section 41, is performed on the luminance value YL1 at the time that the light transmittance ratio T1/T2 is set as the gain value G. Therefore, as shown in FIG. 11B, the above-mentioned difference in level is eliminated.

Next, operations of the digital camera 11 will be described. Assuming that a user operates the mode selection button 19 and the operation mode is set as the still image capturing mode or the moving image capturing mode, the display section 16 displays a live view image (hereinafter referred to as live view display). The user determines the composition while viewing the live view display, and performs imaging.

For example, in a case where the still image capturing mode and the DR expansion mode are selected, assuming that the release button 18 is pressed halfway and pressed fully, the pre-imaging is performed first. In the pre-imaging, imaging is performed in a state where all the segments S are turned off (the light transmittances thereof is equal to the high transmittance T1), thereby generating pre-image data PD.

The number of high luminance pixels calculation section 43 calculates the number of high luminance pixels PH for each segment S, on the basis of the luminance value Y of the pre-image data PD. The main control section 30 specifies the segments S which satisfy a relation of PH≥PN, and determines the segments S as the dimming target segments S1. Then, the low luminance pixel specifying section 44 specifies the pixels, which satisfy Y≤TH2, as the low luminance pixels, among the pixels corresponding to the dimming target segments S1, and sets the pixels as the gain correction targets.

Next, the actual imaging is performed. In the actual imaging, the dimming target segments S1 are turned on, and imaging is performed. The gain correction section 41 performs the gain correction on the pixel signals Rs, Gs, and Bs of the low luminance pixels which are determined as the gain correction targets, on the basis of the RGB image data which is obtained through imaging. Then, the YC conversion section 42 performs the YC conversion on the pixel signals Rs', Gs', and Bs' subjected to the gain correction, thereby generating the YC image data. The YC image data is recorded in the recording medium 40 through the medium control section 35, and an image is displayed on the display section 16 through the display control section 36.

With the above-mentioned configuration, the dynamic range of the solid-state imaging element 24 is artificially expanded, and the difference in level of the low luminance region YL occurring between the dimming target segment S1 and the non-dimming target segment S2 is reduced through the gain correction.

Second Embodiment

In the first embodiment, the low luminance pixel specifying section 44 sets the second luminance value TH2, which is for specifying the low luminance pixels of the dimming target segment S1, as a fixed value. However, the luminance distribution of the low luminance pixels is changed by a luminance of a subject (such as mountains) corresponding to the low luminance region YL, and thus the low luminance pixels are unlikely to be accurately specified.

In a second embodiment, the low luminance pixel specifying section 44 determines the second luminance value TH2 on the basis of the luminance distribution of adjacent segments S (hereinafter referred to as adjacent segments SN) around each dimming target segment S1. The adjacent segments SN may include both the dimming target segments S1 and the non-dimming target segments S2, or may include only the dimming target segments S1.

Figures 12, 13:
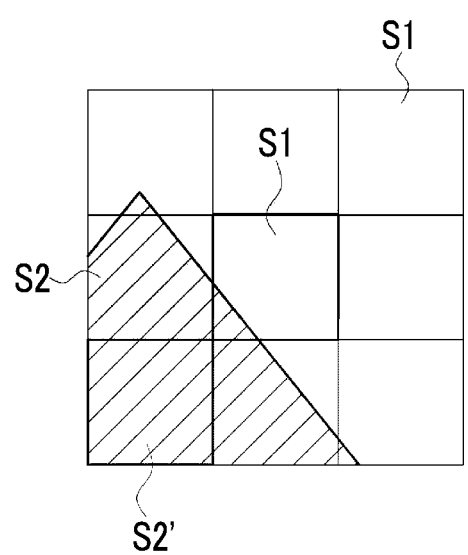
FIG. 12 is a diagram illustrating a relationship between the dimming target segment and the adjacent segments.
FIG. 13 is a diagram illustrating an example in which the adjacent segment includes the dimming target segments and the non-dimming target segments.

The low luminance pixel specifying section 44 acquires the luminance value Y from the pre-image data PD from each of the 8 adjacent segments SN around each dimming target segment S1, as shown in FIG. 12. The low luminance pixel specifying section 44 acquires the luminance distribution of the luminance value Y from each adjacent segment SN, and calculates a maximum luminance value $Y_D$ of each luminance distribution. Then, the low luminance pixel specifying section 44 determines a maximum luminance value $Y_{Dmin}$, which is a minimum of the calculated maximum luminance values $Y_D$, as the second luminance value TH2. It should be noted that the maximum luminance value $Y_D$ of the luminance distribution does not have to be a luminance value Y which is the maximum of the luminance distribution, and may be a luminance value Y at which a cumulative frequency of the luminance distribution reaches a specific value (for example, 99%). In such a manner, it is possible to determine the maximum luminance value $Y_D$ with high accuracy without an effect of the luminance value Y which is greatly deviated from the distribution center by pixel defects or the like.

Figure 14A:
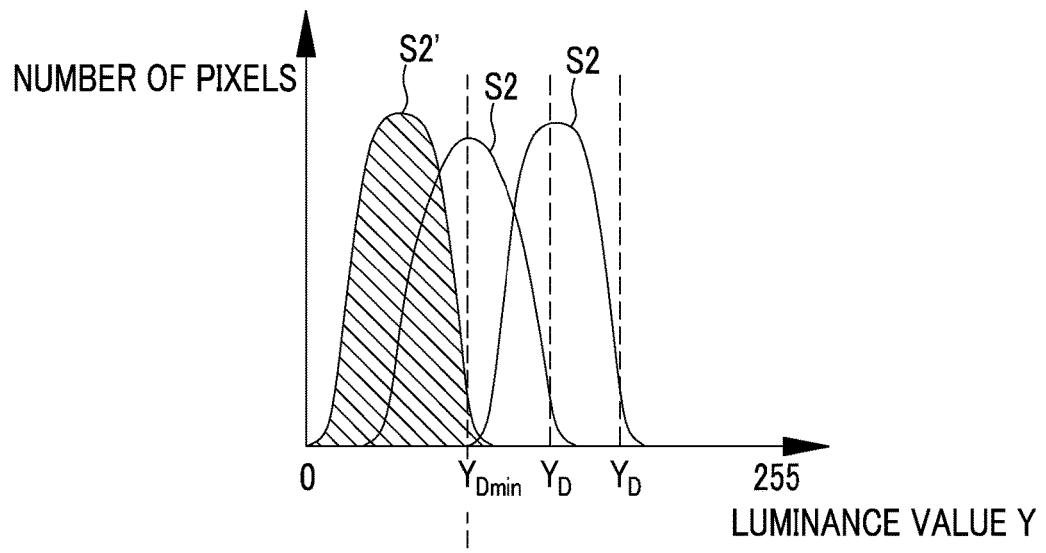
FIGS. 14A and 14B are diagrams illustrating a method of determining a second luminance value of a luminance distribution of the adjacent segments.

For example, as shown in FIG. 13, the adjacent segments SN may include both the dimming target segments S1 and the non-dimming target segments S2. In this case, the non-dimming target segments S2 may mainly include the low luminance region YL. Therefore, as shown in FIG. 14A, the second luminance value TH2 is defined by a segment (non-dimming target segment S2') having a lowest luminance distribution among the non-dimming target segments S2.

Figure 14B:
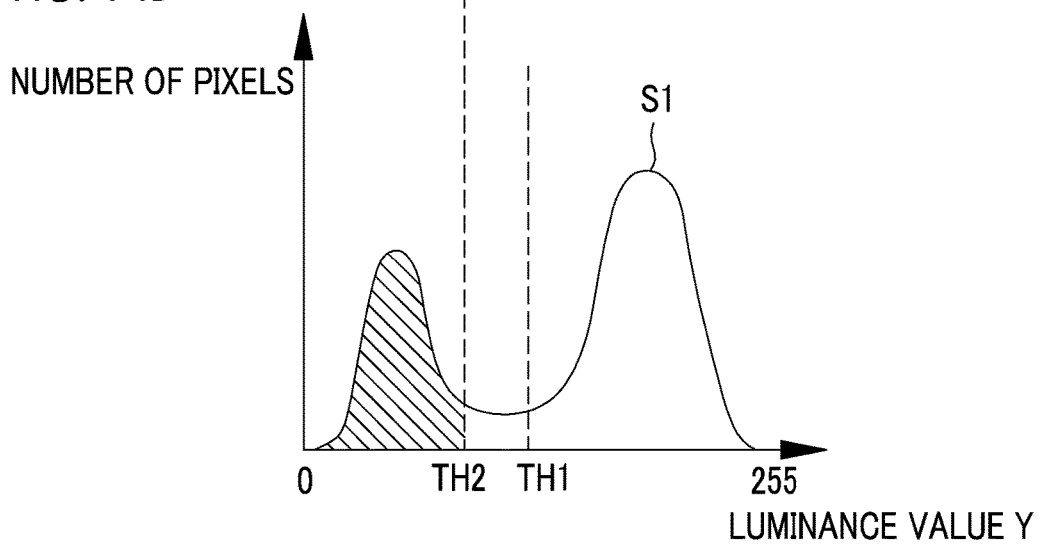

The low luminance region YL of the non-dimming target segment S2' stretches over the dimming target segments S1, and has a luminance interlocking with that of the low luminance region YL of the dimming target segment S1. Therefore, as shown in FIG. 14B, it is possible to accurately specify the low luminance pixels as the gain correction targets on the basis of the luminance distributions of the dimming target segments S1.

Further, in the first and second embodiments, the low luminance pixel specifying section 44 compares the luminance value Y of each pixel of the dimming target segment S1 with the second luminance value TH2, thereby specifying the low luminance pixel as the gain correction target. However, after the low pass filter processing is performed on the luminance value Y of each pixel of the dimming target segment S1, the low luminance pixel specifying section 44 may separately compare the luminance value Y of each pixel with the second luminance value TH2, thereby specifying the low luminance pixel as the gain correction target. The low pass filter processing is performed, for example, by replacing an average luminance value of 5×5 pixels including the target pixel with the luminance value Y of the target pixel.

Assuming that the luminance value Y of each pixel is separately determined, low luminance pixels, which are not included in the low luminance region YL continuous as shown in FIGS. 11A and 11B and are dissipatively present, are set as the gain correction targets. Thus, the gain correction may lower the contrast and S/N. By performing the low pass filter processing, the low luminance pixels, which are dissipatively present, are excluded from the gain correction target. As a result, the contrast and S/N are prevented from being lowered. The other configuration of the second embodiment is the same as that of the first embodiment.

Further, in the first and second embodiments, the low luminance pixel specifying section 44 specifies the low luminance pixels as the gain correction targets for every dimming target segment S1. However, the low luminance pixels as the gain correction targets may be specified for only the segments adjacent to the non-dimming target segments S2 among the dimming target segments S1.

Third Embodiment

In a third embodiment, the dimming target segments S1, which specify the low luminance pixels as the gain correction targets, are restricted on the basis of the number of high luminance pixels PH. Specifically, in the third embodiment, the low luminance pixel specifying section 44 specifies the low luminance pixels from only the dimming target segments S1 each of which has the number of high luminance pixels PH equal to or less than the second number of pixels PN2 (here, PN2>PN). The reason for this is as follows. In the dimming target segment S1 in which the number of high luminance pixels PH is greater than the second number of pixels PN2, in a manner similar to that of the luminance distribution Doff shown in FIG. 7, the low luminance pixels are rarely present, and do not cause the above-mentioned difference in level.

In the present embodiment, as described above, the dimming target segments S1, which specify the low luminance pixels as the gain correction targets, are restricted. Thereby, the processing of the low luminance pixel specifying section 44 is simplified, and a time period of the processing of the gain correction section 41 is shortened. The other configuration of the third embodiment is the same as that of the first or second embodiment.

Fourth Embodiment

Figure 15A:
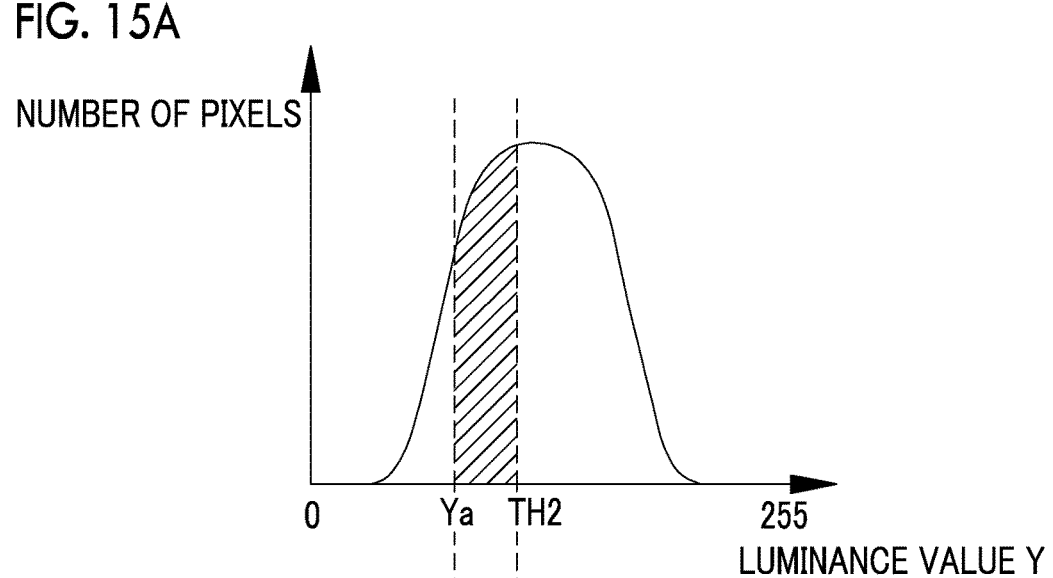
FIGS. 15A and 15B are diagrams illustrating gain correction using a gain function.

In the above-mentioned embodiment, the gain correction section 41 performs the gain correction by using a certain gain value G (=T1/T2) which is determined by only the ratio of the high transmittance T1 to the low transmittance T2. In this case, the gain correction is equally performed on the low luminance pixels having luminance values less than the second luminance value TH2. Therefore, some of the luminance values subjected to the gain correction are greater than the second luminance value TH2, and exceeds luminance values of some pixels which are not the gain correction targets. In the luminance distribution of the dimming target segments S1, as shown in FIG. 15A, some segments include a large number of pixels having luminance values near the second luminance value TH2. As a result, the gain correction may deteriorate an image.

Figure 15B:
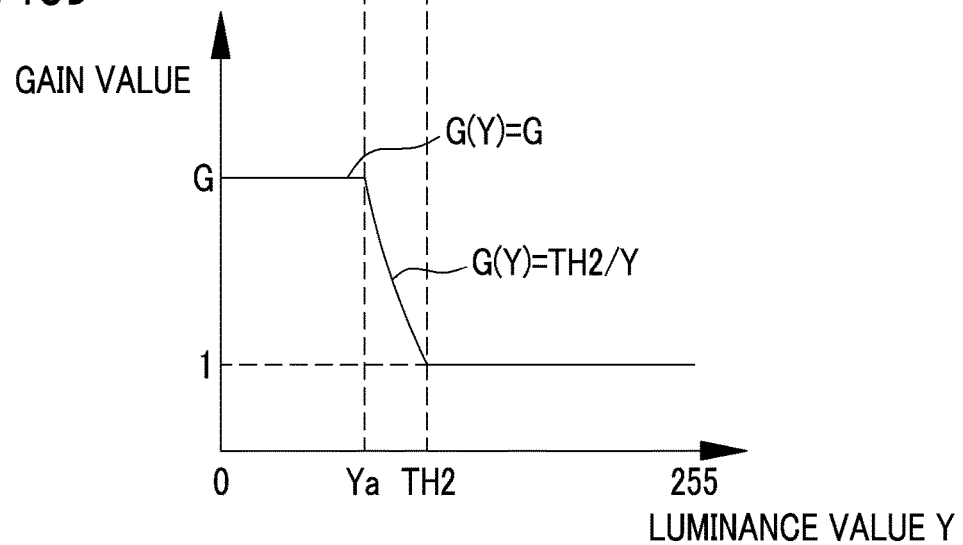

In a fourth embodiment, the gain correction section 41 performs the gain correction by using a gain function G(Y) shown in FIG. 15B. Regarding the gain function G(Y), in a range of Y≤Ya, G(Y)=G, and in a range of Ya<Y≤TH2, G(Y)=TH2/Y. Here, the threshold value Ya satisfies Ya=TH2/G. That is, the gain function G(Y) decreases in inverse proportion to the luminance value Y in the range of Ya<Y≤TH2.

By using the gain function G(Y), the luminance value obtained after the gain correction is prevented from being greater than the second luminance value TH2. In addition, the gain correction section 41 applies the gain function G(Y) to the pixel signals Rs, Gs, and Bs, and performs the gain correction. The other configuration of the fourth embodiment is the same as that of any of the first to third embodiments.

Fifth Embodiment

Figure 16:
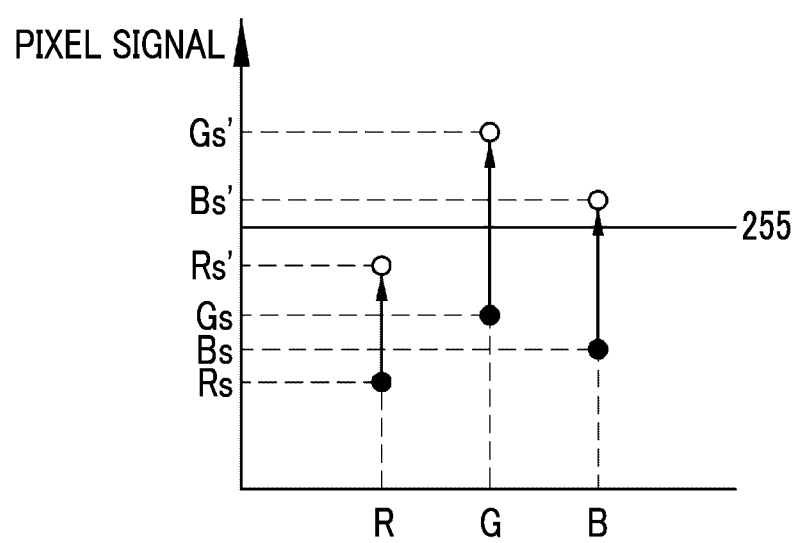
FIG. 16 is a diagram illustrating an example in which an error pixel occurs due to the gain correction.

In the above-mentioned embodiment, the main control section 30 determines the dimming target segment S1 on the basis of the number of high luminance pixels PH calculated for each segment S. However, in a case where calculation based on Expressions (1) to (3) is performed in order to perform the gain correction on the low luminance pixels as the gain correction targets, the calculation results are, as shown in FIG. 16, greater than the upper limit value (255) of the gray level, and the pixel signals Rs', Gs', and Bs' subjected to the gain correction are restricted (capped) by the upper limit value of the gray level. Color information of such low luminance pixels is lost after the gain correction.

In a fifth embodiment, the main control section 30 determines the dimming target segments S1 on the basis of the number of high luminance pixels PH and the low luminance pixels (hereinafter referred to as error pixels) of which the pixel signal values have reached an upper limit value which can be taken through the gain correction.

Figure 17:
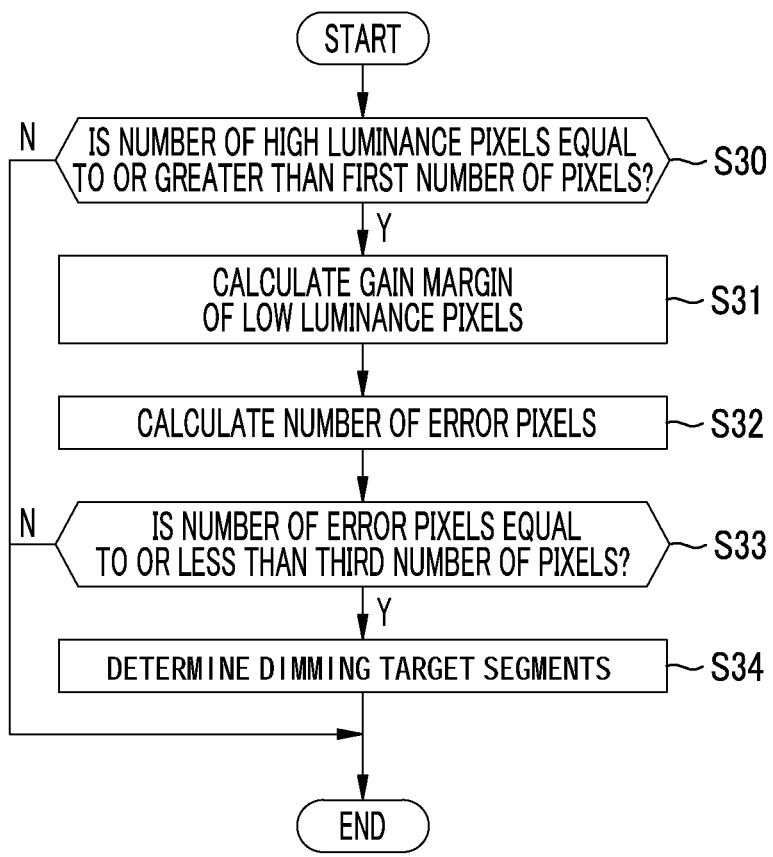
FIG. 17 is a flowchart illustrating a procedure of determining the dimming target segments on the basis of the number of high luminance pixels and the number of error pixels.

Specifically, as shown in FIG. 17, in the fifth embodiment, the main control section 30 compares the number of high luminance pixels PH of each segment S with the first number of pixels PN as described above (S30). On the basis of the comparison result, the main control section 30 calculates the minimum gain margin Gmin for each error pixel in the segments S satisfying PN≤PH (S31). The minimum gain margin Gmin is a minimum value of the gain margin in which the gain of the pixel signals Rs, Gs, and Bs of the error pixels can be corrected through the gain correction, and is a value which is obtained by dividing the upper limit value of the gray level by a largest pixel signal value of the pixel signals Rs, Gs, and Bs of the error pixels.

Then, the main control section 30 calculates the number of error pixels Pe at which the minimum gain margin Gmin is equal to or less than the gain value G (=T1/T2) (S32). The number of error pixels Pe is compared with a certain value (third number of pixels) TH3 (S33), and the segment S satisfying Pe≤TH3 is determined as the dimming target segment S1 (S34). As described above, the main control section 30 functions as the number of error pixels calculation section.

In the present embodiment, the segment S satisfying PN≤PH and Pe≤TH3 is determined as the dimming target segment S1. The other configuration of the fifth embodiment is the same as that of any of the first to fourth embodiments.

Sixth Embodiment

In a sixth embodiment, at the time that the actual imaging is performed in a state where the dimming target segments S1 are turned on and the gain correction is performed, in a case where the pixel signal value reaches the upper limit value which can be taken, the pixel signal value obtained after the gain correction is restricted (capped) on the basis of the gain margin of each pixel signal.

Specifically, the gain correction section 41 acquires the pixel signals Rs, Gs, and Bs for each pixel through the actual imaging, and calculates the above-mentioned minimum gain margin Gmin. Then, the gain correction section 41 multiplies each of the pixel signals Rs, Gs, and Bs of the error pixies by the minimum gain margin Gmin on the basis of Expressions (4) to (6), thereby generating the pixel signals Rs*, Gs*, and Bs* subjected to the gain correction.

$$Rs^* = Rs \times Gmin \quad (4)$$

$$Gs^* = Gs \times Gmin \quad (5)$$

$$Bs^* = Bs \times Gmin \quad (6)$$

Figure 18:
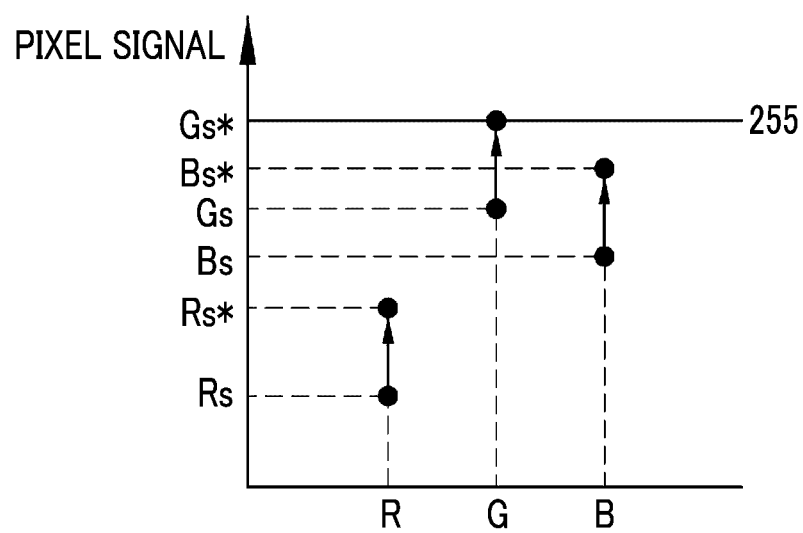
FIG. 18 is a diagram illustrating gain correction using a minimum gain margin.

In the present embodiment, the gain values of the error pixels are restricted to the minimum gain margin Gmin. Therefore, as shown in FIG. 18, there is no loss of color information of the pixel signals Rs*, Gs*, and Bs* subjected to the gain correction. The other configuration of the sixth embodiment is the same as that of any of the first to fourth embodiments.

Seventh Embodiment

In the above-mentioned embodiment, the DR expansion mode can be executed in the still image capturing mode. However, in a seventh embodiment, the DR expansion mode can be executed in the moving image capturing mode.

Figure 19:
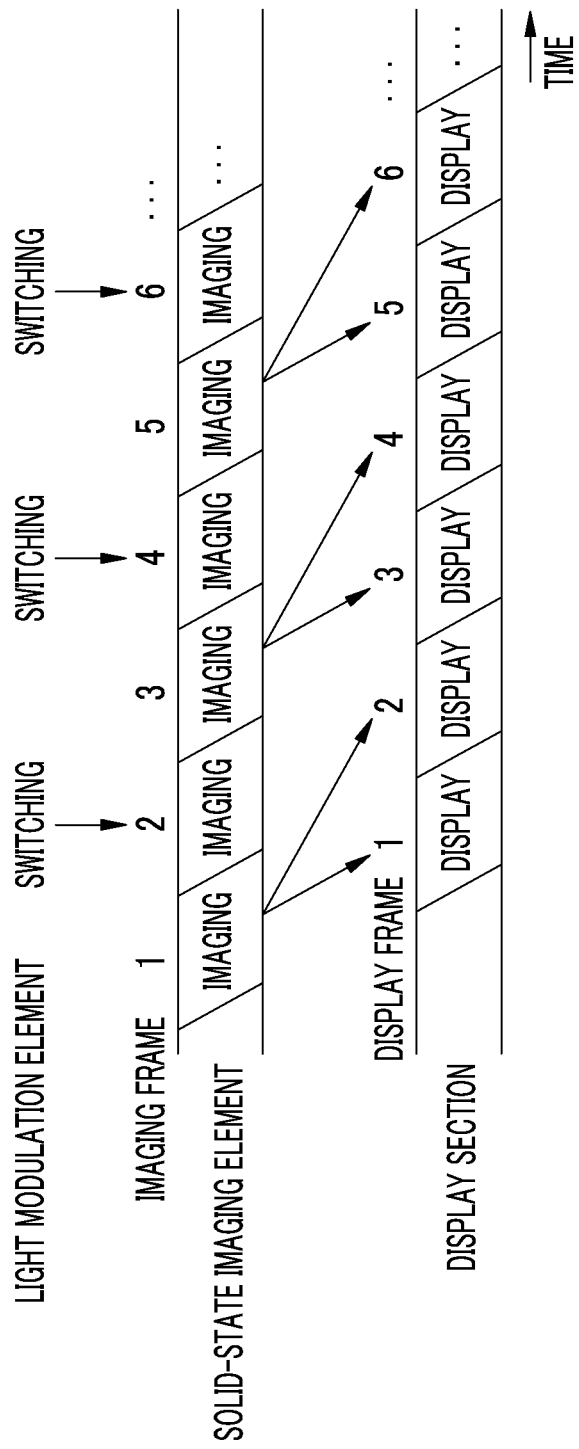
FIG. 19 is a diagram illustrating an imaging operation and a display operation in a moving image capturing mode.

As shown in FIG. 19, in a case where the moving image capturing mode is selected, the solid-state imaging element 24 periodically performs an imaging operation. Then, image data of a plurality of imaging frames obtained by the solid-state imaging element 24 is converted into moving image data by the digital signal processing section 34, and is recorded in the recording medium 40 through the medium control section 35. Subsequently, a moving image based on the moving image data is displayed on the display section 16 through the display control section 36.

In the DR expansion mode, control (switching on/off of the segments S) of the light modulation element 23 is performed at even-numbered imaging frames, on the basis of the image data of odd-numbered imaging frames. The image data of the even-numbered imaging frames is not used as image display data and control data of the light modulation element 23. The reason for this is as follows. The solid-state imaging element 24 is a CMOS type, and performs imaging in a rolling shutter method. Therefore, the segments S are switched on and off in the imaging frames, an exposure time period of at least a single pixel row exceeds switching timing of the segments S, and thus some segments are dimmed in accordance with the passage of time.

Specifically, at the first imaging frame, pre-imaging is performed in a state where all the segments S of the light modulation element 23 are turned off. At the second imaging frame, the dimming target segments S1 are determined and turned on, on the basis of the image data obtained at the first imaging frame. At the third imaging frame, actual imaging is performed.

At the fourth imaging frame, image data obtained at the third imaging frame is set as pre-image data PD, and the dimming target segments S1 are determined again and turned on. At the fifth imaging frame, the actual imaging is performed. Since the dimming target segments S1 are already turned on at the third imaging frame, in the dimming target segments S1 which are already turned on, at the time that the number of high luminance pixels PH is calculated and the low luminance pixels are specified, as the first luminance value TH1 and the second luminance value TH2, values, which are corrected by an amount corresponding to the dimming effect, are used. Specifically, T1=100% and T2=50%, and the luminance distribution is shifted by the dimming effect. Therefore, the first luminance value is indicated by TH1' (=TH1/2), and the second luminance value is indicated by TH2' (=TH2/2). It is also the same for the sixth imaging frame and the following.

The image data of the odd-numbered imaging frame is displayed on odd-numbered display frame and even-numbered display frame. Specifically, as shown in FIG. 19, the image data of the first imaging frame is displayed on the first and second display frames, and the image data of the third imaging frame is displayed on the third and the fourth display frames. It is also the same for the fifth imaging frame and the following.

It should be noted that the DR expansion mode may be executed at the time of live view display. In this case, control such as the control moving image capturing mode may be performed. Further, the DR expansion mode may be configured to be performed only at the time of execution of the live view display and in the moving image capturing mode.

Further, the following configuration may be adopted: in a case where a set value of the ISO sensitivity is less than a certain value, the DR expansion mode is automatically selected; and in a case where the set value of the ISO sensitivity is equal to or greater than the certain value, the normal mode is automatically selected. The reason for this is as follows. The ISO sensitivity is set to be high in a case where a subject is dark and an amount of light is small, and therefore the dimming performed by the light modulation element 23 is not necessary in a case where the set value is high. It should be noted that, for the setting of the ISO sensitivity, a value, which is set by a user by using the operation section 15 or the like, and a value, which is automatically set in the digital camera 11 on the basis of the image data, may be used.

In the above-mentioned embodiments, the pre-image data PD is acquired in a state where all the segments S are turned off at the time of the pre-imaging. However, the pre-image data PD may be acquired in a state where all the segments S are turned on at the time of the pre-imaging.

In the above-mentioned embodiments, the light modulation element 23, which has a high transmittance in an event of being not driven (turned off) and has a low transmittance in an event of being driven (turned on), is used. However, in contrast, a light modulation element, which has a low transmittance in an event of being not driven (turned off) and has a high transmittance in an event of being driven (turned on), is used.

In the above-mentioned embodiments, as the light modulation element 23, a PNLC filter is used, but a liquid crystal filter or EC filter other than the PNLC filter may be used.

In the above-mentioned embodiments, the low luminance pixels as the gain correction targets are specified on the basis of the pre-image data PD. However, the low luminance pixels as the gain correction targets may be specified on the basis of the image data which is obtained through the actual imaging in the dimming target segments S1.

In the above-mentioned embodiments, the gain correction is performed on the pixel signals Rs, Gs, and Bs, but the gain correction may be performed on the luminance signals Y subjected to the YC conversion.

In the above-mentioned embodiments, a primary-color-type color filter is used, but a complementary type color filter may be used. Further, the solid-state imaging element 24 is not limited to a CMOS type image sensor, and a charge coupled device (CCD) type image sensor may be used.

In the above-mentioned embodiments, as the imaging device, the digital camera is exemplified. However, the present invention can be applied to various electronics such as a video camera, a camera-equipped mobile phone, and a smartphone. Further, the above-mentioned embodiments can be combined with each other as long as there is no conflict therebetween.

EXPLANATION OF REFERENCES 11 digital camera
23 light modulation element
24 solid-state imaging element
25 light modulation control section
26 pixel
30 main control section
41 gain correction section
42 YC conversion section
43 number of high luminance pixels calculation section
44 low luminance pixel specifying section
S segment
S1 dimming target segment
S2 non-dimming target segment
SN adjacent segment
YH high luminance region
YL low luminance region
YD maximum luminance value

What is claimed is:
1. An imaging device comprising:
a light modulation element that has a plurality of segments and has a light transmittance which varies between a high transmittance and a low transmittance for each segment;
an imaging element into which light is incident through the light modulation element and in which a plurality of pixels are disposed in each segment;
a number of high luminance pixels calculation section that calculates a number of high luminance pixels which have luminance values equal to or greater than a first luminance value for each segment, on the basis of a captured image signal which is obtained by the imaging element while the transmittances of all the segments are the same;
a control section that controls the light modulation element such that segments each having a number of high luminance pixels equal to or greater than a first number of pixels are set at the low transmittance and the remaining segments are set at the high transmittance;
a low luminance pixel specifying section that specifies low luminance pixels having luminance values equal to or less than a second luminance value in the segments which are set at the low transmittance; and
a gain correction section that performs gain correction on pixel signal values of the low luminance pixels, with a gain value corresponding to a ratio of the high transmittance to the low transmittance.

2. The imaging device according to claim 1, wherein the low luminance pixel specifying section acquires maximum luminance values in a luminance distribution of the pixels respectively corresponding to a plurality of the segments adjacent to the segments which are set at the low transmittance, and sets a minimum value of the maximum luminance values to the second luminance value.

3. The imaging device according to claim 2, wherein the low luminance pixel specifying section sets a luminance value, at which a cumulative frequency of the luminance distribution is equal to a specific value, to the maximum luminance value.

4. The imaging device according to claim 3, wherein when a value obtained by dividing the second luminance value by the gain value is set as a threshold value, the gain correction section receives the gain value in a range equal to or less than the threshold value, and performs the gain correction by using a gain function which decreases in inverse proportion to the second luminance value in a range greater than the threshold value.

5. The imaging device according to claim 1, further comprising a number of error pixels calculation section that calculates the number of error pixels which is the number of low luminance pixels, of which the pixel signal values have reached an upper limit value of a gray level which can be taken, when the gain correction is performed on the segments which are set at the low transmittance,
wherein the control section sets the segments, each of which has a number of high luminance pixels equal to or greater than the first number of pixels and a number of error pixels equal to or less than a second number of pixels, at the low transmittance.

6. The imaging device according to claim 1, wherein the light modulation element is a polymer network liquid crystal device.

7. The imaging device according to claim 1, further comprising an ISO sensitivity setting section that sets an ISO sensitivity,
wherein the control section controls the light modulation element only when a set value of the ISO sensitivity is equal to or less than a certain value.

8. The imaging device according to claim 1,
wherein moving image capturing and live view display are performed, and
wherein the control section controls the light modulation element when the moving image capturing and the live view display are executed.

9. The imaging device according to claim 1,
wherein the imaging element is a single-plate color type imaging element that outputs one type of color signal for each pixel from a plurality of types of color signals,
wherein the imaging device further comprises a luminance color difference conversion section that converts the plurality of types of color signals into luminance values and color difference values for each pixel, and
wherein the number of high luminance pixels calculation section calculates the number of the high luminance pixels, on the basis of the luminance values.

10. The imaging device according to claim 9, wherein the gain correction section performs the gain correction on each of the plurality of types of color signals of the low luminance pixels.

11. The imaging device according to claim 10, wherein while performing the gain correction on the segments which are set at the low transmittance, when a minimum gain margin of values of the plurality of types of color signals of the low luminance pixels is less than the gain value, the gain correction section sets the gain value as the minimum gain margin, and performs the gain correction.

12. The imaging device according to claim 11, wherein the plurality of color signals are red, green, and blue pixel signals.

* * * * *